US008949553B2

(12) United States Patent
Kotzur et al.

(10) Patent No.: US 8,949,553 B2
(45) Date of Patent: Feb. 3, 2015

(54) SYSTEM AND METHOD FOR RETENTION OF HISTORICAL DATA IN STORAGE RESOURCES

(75) Inventors: Gary B. Kotzur, Austin, TX (US); Surender Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 595 days.

(21) Appl. No.: 13/283,911

(22) Filed: Oct. 28, 2011

(65) Prior Publication Data

US 2013/0111161 A1 May 2, 2013

(51) Int. Cl.
*G06F 12/00* (2006.01)
*G06F 12/02* (2006.01)

(52) U.S. Cl.
CPC .... *G06F 12/0246* (2013.01); *G06F 2212/7209* (2013.01)
USPC .......................................................... 711/154

(58) Field of Classification Search
CPC G06F 12/0261; G06F 12/0246; G06F 3/0605
See application file for complete search history.

(56) References Cited

U.S. PATENT DOCUMENTS

| | | | | |
|---|---|---|---|---|
| 7,873,802 | B2 * | 1/2011 | Gokhale et al. | 711/159 |
| 2008/0250270 | A1 | 10/2008 | Bennett | 714/6 |
| 2009/0019459 | A1 * | 1/2009 | Rowan et al. | 719/328 |
| 2009/0254572 | A1 | 10/2009 | Redlich et al. | 707/10 |
| 2009/0327590 | A1 | 12/2009 | Moshayedi | 711/103 |
| 2009/0327591 | A1 | 12/2009 | Moshayedi | 711/103 |
| 2010/0017650 | A1 | 1/2010 | Chin et al. | 714/6 |
| 2010/0037001 | A1 | 2/2010 | Langlois et al. | 711/103 |
| 2010/0064096 | A1 | 3/2010 | Weigarten et al. | 711/103 |
| 2010/0250497 | A1 | 9/2010 | Redlich et al. | 707/661 |

* cited by examiner

*Primary Examiner* — Baboucarr Faal
(74) *Attorney, Agent, or Firm* — Baker Botts L.L.P.

(57) ABSTRACT

In accordance with embodiments of the present disclosure, a method may include receiving a read command. The method may also include determining if the read command is a command to read current data or historical data for a given logical address. The method may additionally include reading data stored on a storage resource at a historical physical address defined by a historical data offset associated with the given logical address in response to determining that the read command is a command to read historical data. The method may further include communicating the data stored at the historical physical address as a response to the read command.

10 Claims, 3 Drawing Sheets

118

| 202 LBA | 205 HISTORICAL DATA OFFSET | 204 PBA | 206 STATUS INFORMATION 208 STALE | 210 RETAIN |
|---|---|---|---|---|
| 0 | 300 | 1000 | Y | Y |
| 1 | 1500 | 50 | Y | N |
| 2 | — | 540 | N | N |
| 3 | — | 25 | N | Y |
| • | • | • | • | • |
| • | • | • | • | • |
| • | • | • | • | • |
| X | Z | Y | Y | N |

118

| 202 LBA | 205 HISTORICAL DATA OFFSET | 204 PBA | 206 STATUS INFORMATION 208 STALE | 210 RETAIN |
|---|---|---|---|---|
| 0 | 300 | 1000 | Y | Y |
| 1 | 1500 | 50 | Y | N |
| 2 | ___ | 540 | N | N |
| 3 | ___ | 25 | N | Y |
| • | • | • | • | • |
| • | • | • | • | • |
| • | • | • | • | • |
| X | Z | Y | Y | N |

SYSTEM AND METHOD FOR RETENTION OF HISTORICAL DATA IN STORAGE RESOURCES

TECHNICAL FIELD

The present disclosure relates in general to information handling systems, and more particularly to retention of historical data in storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of physical storage resources, such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a server chassis, to hundreds of physical storage resources disposed in one or more separate storage enclosures.

For many years, physical storage resources were typically implemented using magnetic storage media. However, in recent years, the industry has shifted to using solid-state storage devices in place of magnetic storage media. Solid-state storage devices may be desirable over magnetic storage media due to reduced latency, higher performance, fewer mechanical components, and other reasons.

While many characteristics of solid-state storage devices make them desirable for use in RAIDs, other characteristics of traditional solid-state storage devices potentially render them unsuitable for use in RAIDs or other applications. One characteristic is the inability of traditional solid-state storage devices to retain historical data for use by RAID systems or other applications. RAID systems may utilize such data in order to generate parity protection. But generation of parity data using traditional solid-state storage devices may lead to increased latency in generating parity due to the inability to effectively retain historical data.

Traditional solid-state storage devices are typically based on NAND flash technology which, when written to must erase old data in a storage location before new data can be written. Accordingly, solid-state storage devices abstract a logical block address as seen by a user or operating system from a physical block address used at the flash level. This allows the solid-state storage device to accept the new data which is stored at a physically different location and to tag the old data as invalid, and such invalid data may be later erased when it is efficient to perform such erasure. In traditional solid-state storage devices, two algorithms are implemented that handle these operations in the background, transparent to the user. The first is commonly referred to as "garbage collection" and handles indentifying those blocks in flash containing the highest concentration of stale data and tagging such blocks as "erase candidates." The second is commonly referred to as "data reclamation" and facilitates moving all of the valid data from these erase candidates into new locations on flash. Once the valid data is relocated, the erase candidates can then be erased to be used for future write operations. From the time that data is tagged as stale to the time that it is erased, such "historical data" is actually retained in flash, but not available to the user.

SUMMARY

In accordance with the teachings of the present disclosure, the disadvantages and problems associated with retention of historical data in storage resources have been reduced or eliminated.

In accordance with embodiments of the present disclosure, a storage resource may have stored thereon a retention mode variable indicating whether the storage resource is configured to retain stale data stored on the storage resource and an address mapping table. The mapping table may include one or more entries, each entry associating a logical address with a corresponding physical address. For each physical address, the mapping table may include a stale variable indicating whether data stored at the physical address is stale. For each physical address, the mapping table may include a retain variable indicating whether data stored at the physical address is to be retained if data stored at the physical address is stale. For each logical address, the mapping table may include a historical data offset, indicating a second physical address at which historical data associated with the logical address is located.

In accordance with other embodiments of the present disclosure, a method may include receiving a read command. The method may also include determining if the read command is a command to read current data or historical data for a given logical address. The method may additionally include reading data stored on a storage resource at a historical physical address defined by a historical data offset associated with the given logical address in response to determining that the read command is a command to read historical data. The method may further include communicating the data stored at the historical physical address as a response to the read command.

In accordance with another embodiment of the present disclosure, a method may in include receiving a write command. The method may also include determining if data exists at a physical address associated a logical address of the write command. The method may additionally include determining if a retention mode variable is set, the retention mode variable indicating whether a storage resource is configured to retain stale data stored on the storage resource. The method may further include retaining historical data associated with the physical address by setting a stale variable associated with the physical address and setting a retain variable associated with the physical address in response to determining that data exists at the physical address and determining that the retention mode variable is set.

Technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
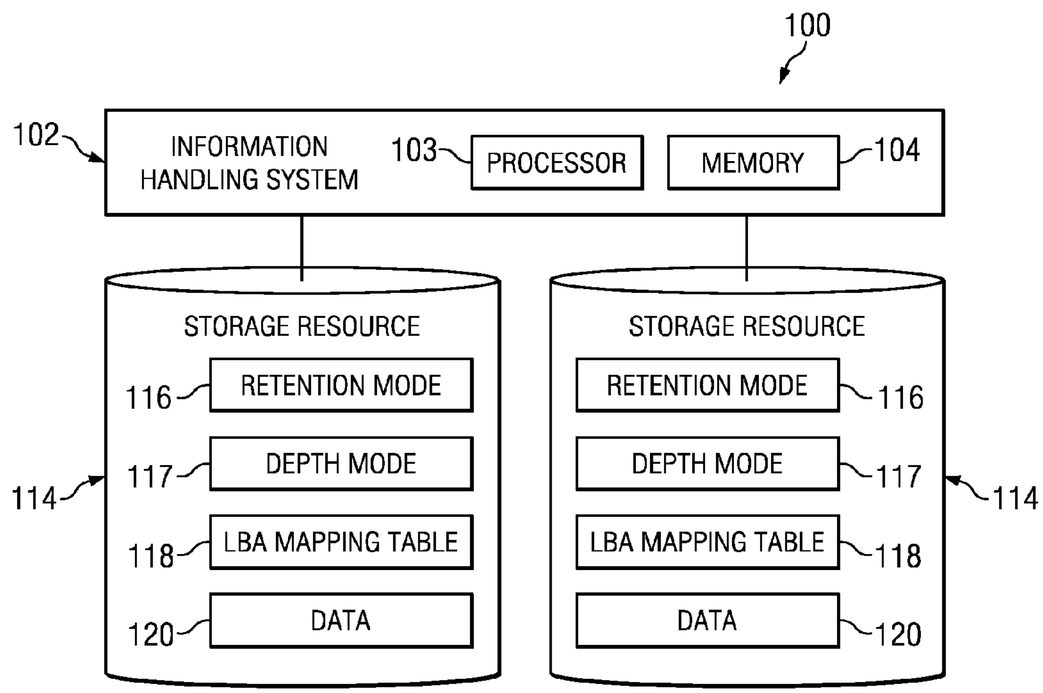
FIG. 1 is a block diagram of an example system for retention of historical data in storage resources, in accordance with certain embodiments of the present disclosure.

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage unit or "virtual storage resource."

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 1 is a block diagram of an example system 100 for retention of historical data in storage resources, in accordance with certain embodiments of the present disclosure. As depicted in FIG. 1, system 100 may include an information handling system 102 and one or more storage resources 114.

Information handling system 102 may generally be operable to receive data from and/or communicate data to one or more storage resources 114. In certain embodiments, information handling system 102 may be a server. In another embodiment, information handling system 102 may be a personal computer (e.g., a desktop computer or a portable computer). In yet another embodiment, information handling system 102 may be a storage controller (e.g., a RAID controller or a host bus adapter (HBA)). As depicted in FIG. 1, information handling system 102 may include a processor 103 and a memory 104 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Storage resources 114 may include hard disk drives, magnetic tape libraries, optical disk drives, magneto-optical disk drives, compact disk drives, compact disk arrays, disk array controllers, and/or any computer-readable medium operable to store data. In particular embodiments, one or more storage resources 114 may comprise solid-state storage devices. In some embodiments, storage resources 114 may form all or part of a redundant storage array (e.g., a RAID). In such embodiments, storage resources 114 participating in the redundant storage array may appear to an operating system executing on information handling system 102 as a single logical storage unit or virtual resource. Thus, information handling system 102 may "see" a logical unit instead of seeing each individual physical storage resource 114. Although FIG. 1 depicts storage resources 114 as components of system 100 separate from information handling system 102, in some embodiments, one or more storage resources 114 may be integral to information handling system 102.

As shown in FIG. 1, a storage resource 114 may have stored thereon a retention mode variable 116, a depth mode variable 117, a logical block address (LBA) mapping table 118, and data 120. Retention mode variable 116 may include any variable that may be set by a user, operating system, and/or application executing on information handling system that indicates whether storage resource 114 is enabled or disabled to retain historical data in accordance with the present disclosure. In some embodiments, retention mode variable 116 may be set to "disabled" by default, because not all applications may utilize or support utilization of the historical data retention feature. When retention mode variable 116 of a storage resource 114 is set to "disabled," such storage resource 114 may operate identically or similarly to a traditional storage resource without retention of historical data. However, when the retention mode variable is set to "enabled," storage resource 114 may retain historical data as further described in this disclosure, until such time as a command for a specific data location is issued for the historical data stored at such location to be released.

Depth mode variable 117 may include any variable that may be set by a user, operating system, and/or application executing on information handling system that indicates a desired level of historical retention of data for a particular LBA. In some embodiments, the variable may be an integer number defining the number of historical entries retained for a particular LBA. In other embodiments, the variable may be a binary variable, indicating whether or not more than one level of historical data is to be retained.

Figures 2, 4:
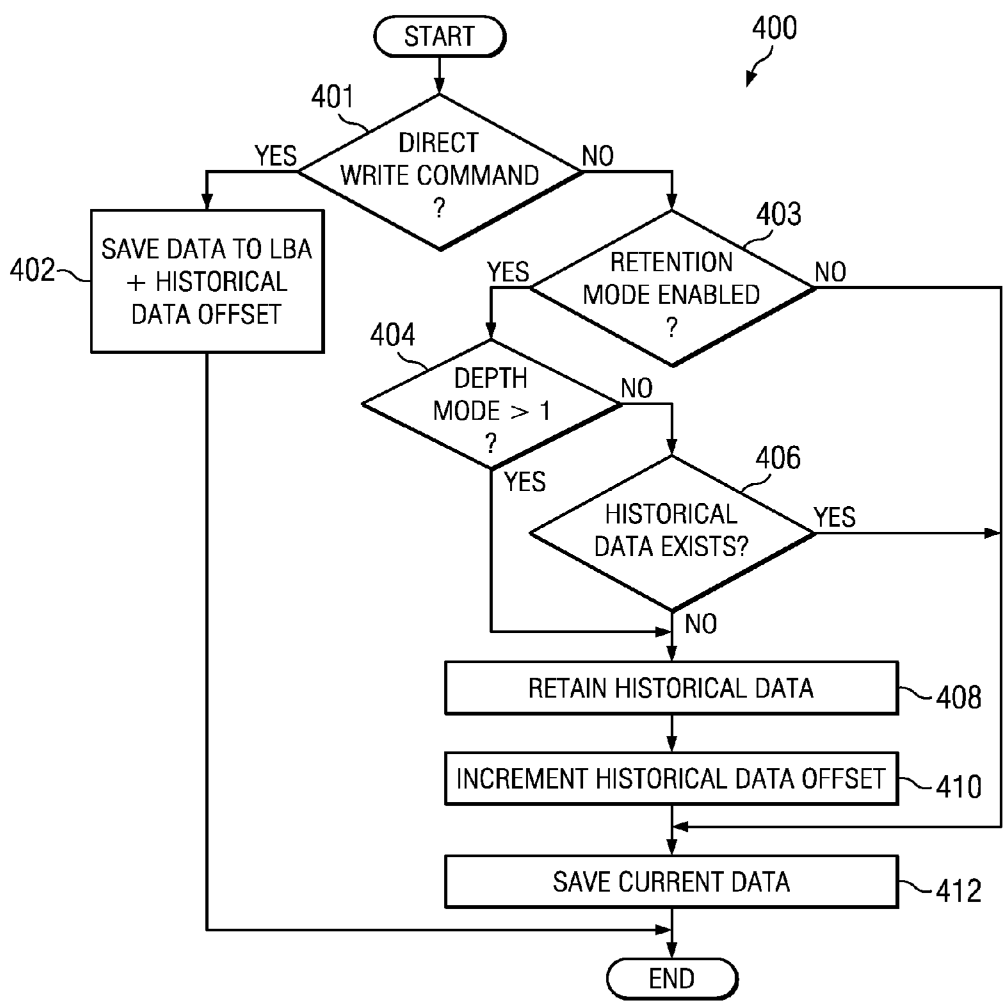
FIG. 2 illustrates an example mapping table, in accordance with certain embodiments of the present disclosure.
FIG. 4 illustrates a flow chart of an example method for execution of a write operation, in accordance with the present disclosure.

An LBA mapping table 118 include any table, map, list, and/or other data structure setting forth mapping between LBAs of data (e.g., as seen by a user, operating system, or application of information handling system 102 or a RAID controller) to a physical block address (PBA) of the data as it resides on storage resource 114. FIG. 2 illustrates an example mapping table 118. As shown in FIG. 2, in addition to setting forth mappings between LBAs 202 and PBAs 204, mapping table 118 may also include status information 206 associated with the various PBAs 204. Status information 206 for each PBA 204 may include, among other things, a stale variable 208 indicating whether data stored at the PBA is stale, and a retain variable 210 indicating whether data stored at the PBA is to be retained. In addition, in some embodiments, a historical data offset field 205 associated with an LBA 204 may be populated. Historical data offset field 205 may be used in scenarios in which the depth of historical data to be retained is more than one, and the value set forth in the historical data offset field 205 may be used to track the depth of the historical data relative to the LBA. As described in greater detail below, input/output (I/O) operations to and from a storage resource may be performed based on such status information 206 and/or historical data offsets 205.

To support I/O relating to historical data, I/O commands (e.g., read and write commands) may include one or more additional variables (e.g., in header fields) indicating whether a particular read or write command is directed to current (e.g., valid) data or maintained historical (e.g., stale) data. Existing standard I/O commands may be modified to include such variables (e.g., by use of vendor-specific fields provided for in such standards), in order to maintain compatibility with prevailing standards. Example of the application of such variables are set forth in the discussion of FIGS. 3-5 below. Such discussion includes methods for executing I/O commands related to I/O of historical data.

Figure 3:
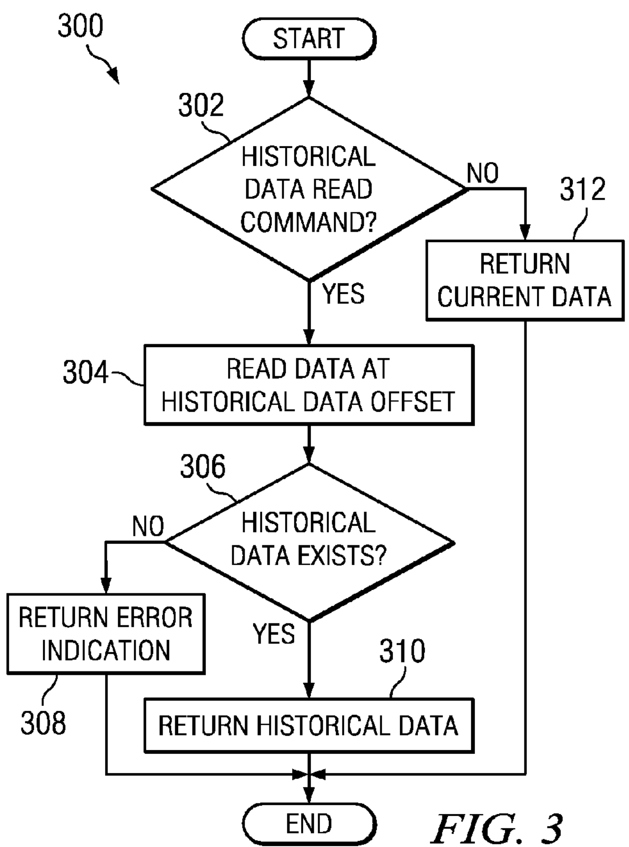
FIG. 3 illustrates a flow chart of an example method for execution of a read operation, in accordance with the present disclosure.

FIG. 3 illustrates a flow chart of an example method 300 for execution of a read operation, in accordance with the present disclosure. According to one embodiment, method 300 may begin at step 302. As noted above, teachings of the present disclosure may be implemented in a variety of configurations of system 100. As such, the preferred initialization point for method 300 and the order of the steps 302-312 comprising method 300 may depend on the implementation chosen.

At step 302, after receipt of a read command (e.g., from an application or operating system executing on information handling system 102), a storage resource 114 may determine if the read command is a command to read current data or historical data. Such determination may be made, for example, by examining a variable in the read command (e.g., a field in a command header) indicating whether the command is directed towards current or historical data. If the read command is a historical data read command, method 300 may proceed to step 304. Otherwise, if the read command is a current data read command, method 300 may proceed to step 312.

At step 304, storage resource 114 may attempt to read data based on an LBA set forth in the read command. Based on the LBA, storage resource 114 may, by reference to LBA mapping table 118, determine a corresponding PBA and (if applicable) historical data offset associated with the LBA.

At step 306, storage resource 114 may determine if historical data exists at a PBA defined by the LBA and historical data offset. If historical data exists at such location, method 300 may proceed to step 310. Otherwise, if no historical data exists at such location, method 300 may proceed to step 308.

At step 308, in response to a determination that no historical data exists at a location defined by an LBA and historical data offset, storage resource 114 may return (e.g., to an operating system or application initiating the read command) a message indicating an error in response to the read command. After completion of step 308, method 300 may end.

At step 310, in response to a determination that historical data exists at a location defined by an LBA and historical data offset, storage resource 114 may return (e.g., to an operating system or application initiating the read command) the historical data at such location in response to the read command. After completion of step 310, method 300 may end.

At step 312, storage resource 114 may return (e.g., to an operating system or application initiating the read command) current data in response to the read command. After completion of step 312, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

FIG. 4 illustrates a flow chart of an example method 400 for execution of a write operation, in accordance with the present disclosure. According to one embodiment, method 400 may begin at step 402. As noted above, teachings of the present disclosure may be implemented in a variety of configurations of system 100. As such, the preferred initialization point for method 400 and the order of the steps 401-412 comprising method 400 may depend on the implementation chosen.

At step 401, after receipt of a write command (e.g., from an application or operating system executing on information handling system 102), a storage resource 114 may determine if the write command is a "direct write" command. A direct write command may be issued (e.g., by a RAID controller) to correct known bad data on storage resource 114 (e.g., by overwriting data at the PBA associated with the LBA of the write command). If the write command is a direct write command, method 400 may proceed to step 402. Otherwise, method 400 may proceed to step 403).

At step 402, in response to a determination that the write command is a direct write command, storage resource 114 may perform the direct write command by saving data to an address defined by the LBA and historical data offset. After completion of step 402, method 400 may end.

At step 403, in response to a determination that the write command is not a direct write command, a storage resource 114 may determine if retention mode variable 116 is set to enabled or disabled for the storage resource. If the retention mode is enabled, method 400 may proceed to step 404. Otherwise, if the retention mode is not enabled, method 400 may proceed to step 412.

At step 404, storage resource 114 may determine if the depth mode variable is set for a level of more than one historical entry for an LBA. If the depth mode variable is set for more than one level, method 400 may proceed to step 408. Otherwise, if the depth mode variable is set for one level of depth, method 400 may proceed to step 406.

At step 406, in response to a determination that the depth mode variable is set for one level of depth, storage resource 114 may determine if historical data exists for the LBA associated with the write command by reference to LBA mapping table 118. In particular, storage resource 112 may reference LBA mapping table 118 to determine if a PBA is associated with the LBA of the write command, and if so, whether data at such PBA is to be retained. If historical data exists for the LBA, method 400 may proceed to step 412. Otherwise, if historical data does not exist for the LBA, method 400 may proceed to step 408.

At step 408, storage resource 114 may retain historical data (e.g., the data to be virtually overwritten for the LBA) by setting stale variable 208 associated with the PBA to indicate it is stale/historical data and setting retain variable 210 associated with the PBA to indicate it is historical data to be retained and not erased during garbage collection.

At step 410, storage resource 114 may increment the historical data offset, effectively pushing the most recently retained historical data to the top of a data stack of retained historical data for the LBA.

At step 412, storage resource 114 may save the current data by storing the data to a PBA and associating the PBA with the LBA for the data set forth in the write command. After completion of step 412, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software and/or firmware embodied in computer-readable media.

Figure 5:
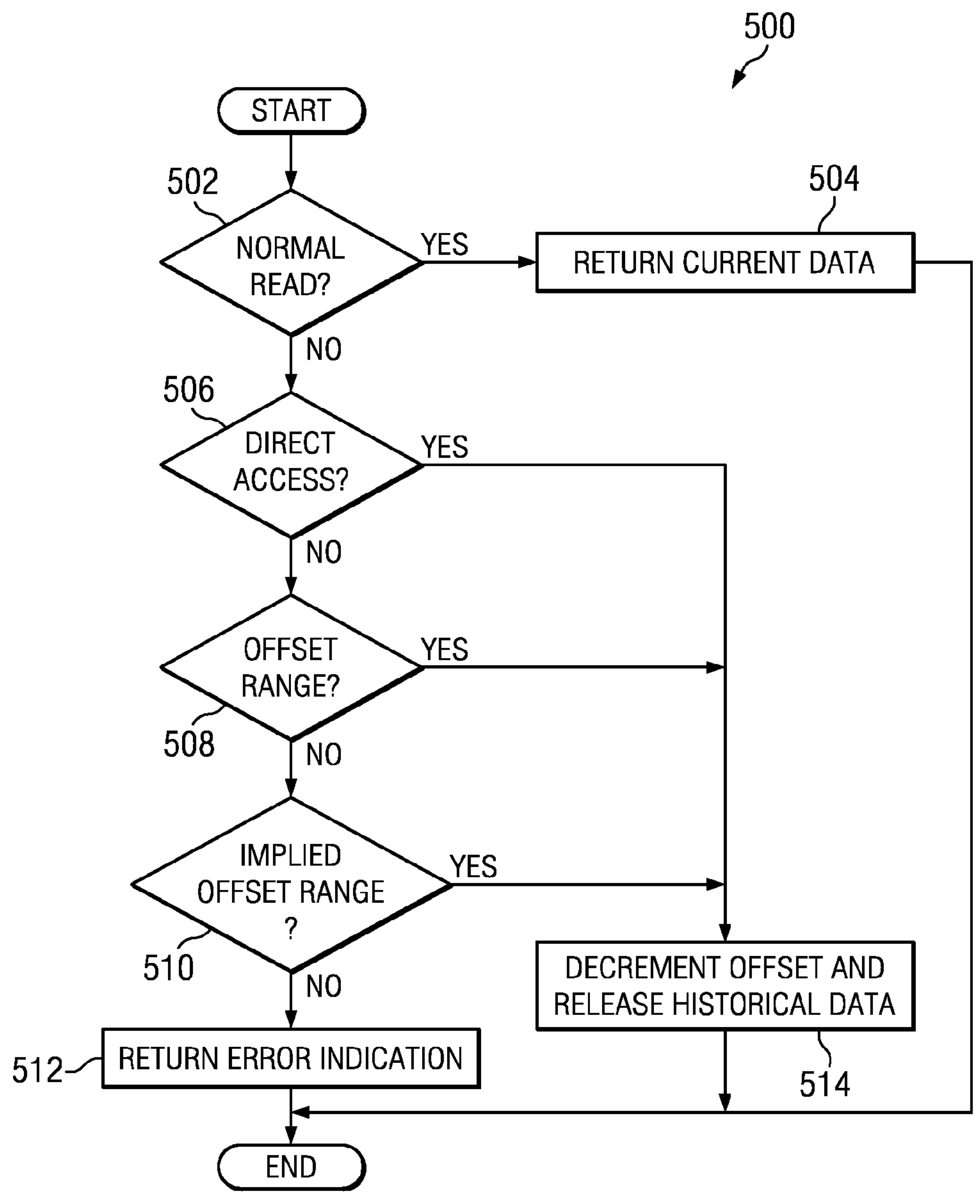
FIG. 5 illustrates a flow chart of an example method for execution of a release operation, in accordance with the present disclosure.

FIG. 5 illustrates a flow chart of an example method 500 for execution of a release operation, in accordance with the present disclosure. According to one embodiment, method 500 may begin at step 502. As noted above, teachings of the present disclosure may be implemented in a variety of configurations of system 100. As such, the preferred initialization point for method 500 and the order of the steps 502-512 comprising method 500 may depend on the implementation chosen.

A "release operation," as used herein, refers in general to an instruction that may be communicated to a storage resource to "release" a PBA so that historical data stored at the PBA may be erased via garbage collection and/or data reclamation. In order to maintain compatibility with existing I/O standards, a release operation may be, in certain embodiments, executed by modifying an existing standard I/O command (e.g., a read command) to include a variable or operator (e.g., by use of vendor-specific fields provided for in such standards) indicating that the command is to be used to release a PBA. In other embodiments, a release operation may be a separate release command independent from a read command. A release operation may also include one or more variables indicating which PBAs are to be released. For example, a release operation may use "direct addressing" in which the release operation includes a historical data offset at which data may be released. As another example, a release operation may use "offset range addressing" in which the release operation includes a range of historical data offsets for which data may be released. As a further example, a release operation may used "implied offset range addressing," in which the head of a historical offset stack may be implied at the beginning of a range of data, and a given offset included in the release operation may define the end of the range.

At step 502, after receipt of a read command (e.g., from an application or operating system executing on information handling system 102), a storage resource 114 may determine if the read command is a "normal" read operation, or is one for releasing historical data. Such determination may be made, for example, by examining a variable in the read command (e.g., a field in a command header) indicating whether the command is directed towards a normal read or releasing historical data. If the read command is a normal read command, method 500 may proceed to step 504. Otherwise, if the read command is not a normal data read command, method 500 may proceed to step 506.

At step 504, in response to a determination that the received read command is a normal read command, storage resource 114 may return data in response to the read command. Steps 502-504 may be executed in those embodiments in which a release operation is executed as a result of a read command. In other embodiments in which a release operation is a separate command, steps 502 and 504 may not be present, and method 500 may begin at step 506.

At step 506, storage resource 114 may determine if the read command is a release operation using direct access addressing. Such determination may be made, for example, by examining a variable in the read command (e.g., a field in a command header) indicating whether the command is directed towards release operation using direct access addressing. If the read command is a release operation using direct access addressing, method 500 may proceed to step 514. Otherwise, if the read command is not a release operation using direct access addressing, method 500 may proceed to step 508.

At step 508, storage resource 114 may determine if the read command is a release operation using offset range addressing. Such determination may be made, for example, by examining a variable in the read command (e.g., a field in a command header) indicating whether the command is directed towards release operation using offset range addressing. If the read command is a release operation using offset range addressing, method 500 may proceed to step 514. Otherwise, if the read command is not a release operation using offset range addressing, method 500 may proceed to step 510.

At step 510, storage resource 114 may determine if the read command is a release operation using implied offset range addressing. Such determination may be made, for example, by examining a variable in the read command (e.g., a field in a command header) indicating whether the command is directed towards release operation using implied offset range addressing. If the read command is a release operation using implied offset range addressing, method 500 may proceed to step 514. Otherwise, if the read command is not a release operation using offset range addressing, method 500 may proceed to step 512.

At step 512, storage resource 114 may return (e.g., to an operating system or application initiating the read command) a message indicating an error in response to the read command. After completion of step 512, method 400 may end.

At step 514, storage resource 114 may release historical data indicated for each LBA in the range indicated by the release operation (e.g., by appropriately setting retain variable 210 for each LBA in the range to indicate data at such LBA need not be retained). After completion of step 514, method 400 may end.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 300, the steps comprising method 500 may be completed in any suitable order.

Method 500 may be implemented using system 100 or any other system operable to implement method 500. In certain embodiments, method 500 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising a storage controller operatively coupled with a non-transitory computer readable medium, the non-transitory computer readable medium including:

a retention mode variable indicating whether the storage controller is configured to retain stale data stored on the non-transitory computer readable medium;

an address mapping table, the mapping table comprising:

one or more entries, each entry associating a logical address with a corresponding physical address;

for each physical address, a stale variable indicating whether data stored at the physical address is stale;

for each physical address, a retain variable indicating whether data stored at the physical address is to be retained if data stored at the physical address is stale; and for each logical address, a historical data offset, indicating a second physical address at which historical data associated with the logical address is located.

2. A system according to claim 1, the storage controller configured to, in response to a read command received by the storage controller:

determine if the read command is a command to read current data or historical data for a given logical address;

return current data for the given logical address from the physical address indicated to be associated with the given logical address in the mapping table in response to determining the read command is a command to read current data; and return historical data associated with the logical address indicated to be associated with the given virtual address in the mapping table from a physical address indicated by the historical data offset in response to determining the read command is a command to read historical data.

3. A system according to claim 1, the storage controller configured to, in response to a write command received by the storage controller:

determine if data exists at a physical address associated with a logical address of the write command;

determine if the retention mode variable is set; and retain historical data associated with the logical address by setting the stale variable associated with the physical address and setting the retain variable associated with the physical address in response to determining that data exists at the physical address and determining that the retention mode variable is set.

4. A system according to claim 3, the storage controller further configured to:

save data associated with the write command to a second physical address; and update the mapping data to indicate the association between the logical address and the second physical address.

5. A system according to claim 1, the storage controller configured to in response to a command to perform a release operation received by the storage resource, release data stored at a physical address associated with the command by clearing the retain variable associated with the physical address.

6. A system according to claim 1, the storage controller configured to, when performing garbage collection and data reclamation on storage media of the storage resource:

perform garbage collection and data reclamation for addresses in which the retain variable is cleared; and defer garbage collection and data reclamation for addresses in which the retain variable is enabled.

7. A system according to claim 1, the non-transitory computer readable medium comprising a solid-state storage device.

8. A system according to claim 1, the logical addresses comprising logical block addresses and the physical addresses comprising physical block addresses.

9. A method comprising:

receiving a write command;

determining if data exists at a physical address associated a logical address of the write command;

determining if a retention mode variable is set, the retention mode variable indicating whether a storage resource is configured to retain stale data stored on the storage resource; and retaining historical data associated with the physical address by setting a stale variable associated with the physical address and setting a retain variable associated with the physical address in response to determining that data exists at the physical address and determining that the retention mode variable is set.

10. A method according to claim 4, further comprising:

saving data associated with the write command to a second physical address; and updating a mapping data to indicate the association between the virtual address and the second physical address.

* * * * *